United States Patent [19]
Nagasaki et al.
[11] Patent Number: 4,752,315
[45] Date of Patent: Jun. 21, 1988

[54] SUCTION HEAD FOR SLAG REMOVAL

[75] Inventors: Katsumi Nagasaki, Sakai; Yoshihiro Inoue, Nishinomiya; Tetsuo Momose, Yao, all of Japan

[73] Assignee: Kubota, Ltd., Osaka, Japan

[21] Appl. No.: 891,267

[22] Filed: Jul. 27, 1986

[30] Foreign Application Priority Data

Aug. 7, 1985 [JP] Japan .............................. 60-121321

[51] Int. Cl.⁴ ......................... C03B 5/23; C21B 3/04; C21B 7/14

[52] U.S. Cl. ...................................... 65/141; 266/227; 266/228; 75/24

[58] Field of Search .................... 65/19, 141; 266/227, 266/228; 75/24, 30; 239/132

[56] References Cited

U.S. PATENT DOCUMENTS 3,979,108 9/1976 Nagasaki et al. .................... 266/227
4,077,615 3/1978 Nagasaki et al. .................... 266/227
4,160,662 7/1979 Nagasaki et al. .................... 266/227
4,416,442 11/1983 Hiroshima et al. ................. 266/227

FOREIGN PATENT DOCUMENTS 60-50381 3/1985 Japan .................................. 266/227

*Primary Examiner*—S. Leon Bashore
*Assistant Examiner*—Michael K. Boyer
*Attorney, Agent, or Firm*—Joseph W. Farley

[57] ABSTRACT

A nozzle or nozzles for spraying cooling water are disposed at the lower end of a slag suction path. A cooling water down-flow passage is provided on the outer periphery of an inner tube which constitutes a slag suction path. A water sump is provided below the cooling water down-flow passage, the water sump being located lower than the each nozzle. A lower end opening of the cooling water down-flow passage is disposed lower than the each nozzle and is submerged in water in the water sump. The cooling water down-flow passage, except the lower end opening, is adapted to be closed up. When the cooling water down-flow passage is closed up, water in the passage is stopped by atmospheric pressure acting upon the surface of the water in the water sump, so that it is prevented from flowing down.

12 Claims, 6 Drawing Sheets

SUCTION HEAD FOR SLAG REMOVAL

FIELD OF THE INVENTION

This invention relates to a suction head for removal of slag from molten metal which is employed in removing by suction upward the slag floating on the surface of the molten metal.

BACKGROUND OF THE INVENTION

Such a suction head is usually disposed vertically and has an upwardly extending slag suction path formed therewithin, with a lower end suction port positioned close above the slag. Nozzles for spraying cooling water toward the slag suction path are disposed around the lower end suction port, so that the slag, as it is sucked, is cooled by the cooling water from the nozzles and is thus solidified. The suction head is of a duplex tube construction such that its inner tube defines the slag suction path, with a gap defined between the inner tube and an outer tube, the gap being utilized as a cooling water down-flow passage for supply of cooling water to the nozzles.

Conventionally, means for stopping and resuming water feed to the nozzles comprise a shutter for opening and closing the nozzles, and a drive mechanism for opening and closing the shutter by air pressure. The shutter comprises a cylindrical member disposed adjacent an outer peripheral portion of the inner tube, and is adapted to be moved back and forth by the drive mechanism in the axial direction so that it is opened and closed.

Since it is disposed adjacent the inner tube defining the slag suction path, however, the shutter is subject to thermal deformation by the hot slag passing through the slag suction path. Such thermal deformation may often render it impossible to open and close the nozzles.

DISCLOSURE OF THE INVENTION

This invention is intended to solve the aforesaid problem in the prior art and has as its primary object the provision of a suction head for removal of slag from molten metal which can smoothly perform water feed to the nozzles and suspension of such feed without being adversely affected by heat from hot sucked-up slag.

In order to accomplish said object, the invention provides a suction head for removal of slag, disposed vertically and having a lower end suction port positioned close above the slag floating on the surface of molten metal, an upwardly extending slag suction path which communicates with the lower end suction port, a nozzle or nozzles for spraying cooling water toward the slag suction path, and a cooling water down-flow passage for supply of cooling water to each nozzle, comprising a water sump disposed below the cooling water down-flow passage and communicating with said down-flow passage and with each nozzle, said water sump being positioned lower than each nozzle, a lower end opening of the cooling water down-flow passage, said lower end opening being disposed lower than each nozzle, and closing means for closing the cooling water down-flow passage except the lower end opening.

According to this arrangement, the lower end opening of the cooling water down-flow passage is disposed lower than each nozzle, and therefore whenever, in conjunction with the suspension of slag sucking operation, water supply to the cooling water down-flow passage is stopped and the passage is closed up by the closing means, the lower end opening is submerged under the water in the water sump. Accordingly, the water in the down-flow passage is stopped by the atmospheric pressure acting on the surface of the water in the water sump, being thus prevented from flowing down. Furthermore, the fact that each nozzle is located at a level higher than the lower end opening, or higher than the water surface in the water sump, eliminates the possibility of water flowing out of each nozzle.

Therefore, it is possible to accurately effect and stop water feed to the nozzles without requiring a shutter and drive means therefor as conventionally provided adjacent the slag suction path. Thus, the suction head can be made simple and compact in construction. Hence, it is possible to eliminate the possibility of such danger that if, for example, water supply to each nozzle could not be stopped as a result of the shutter or drive means failing during slag suction stop, a large amount of water might flow down onto the molten metal, then resulting in catastrophic boiling. The safety of slag removing operation can thus be satisfactorily maintained. Since the necessity of providing a shutter and drive means therefor in the cooling water flow-down passage is eliminated as above mentioned, it is now possible to house a slag detecting probe or probes in the flow-down passage.

Hitherto, it has been common practice to mount such a probe to a side portion of the suction head. With the probe disposed at such location remote from the slag surface, however, it is difficult to detect an accurate slag level relative to the suction port. Further, such way of detection naturally adds to the overall size of the suction head.

In contrast, where probes are housed in the cooling water down-flow passage, the proves can be disposed adjacent the lower end suction port; therefore, it is possible to accurately detect the level of the slag relative to the suction port and thus to allow adequate suction. Further, the incorporation of the probes within the suction head eliminate the possibility of the suction head becoming larger in size. Since the probes are disposed within the cooling water flow-down passage, they are satisfactorily cooled by cooling water.

DESCRIPTION OF THE PREFERRED EMBODIMENTS

Figure 1:
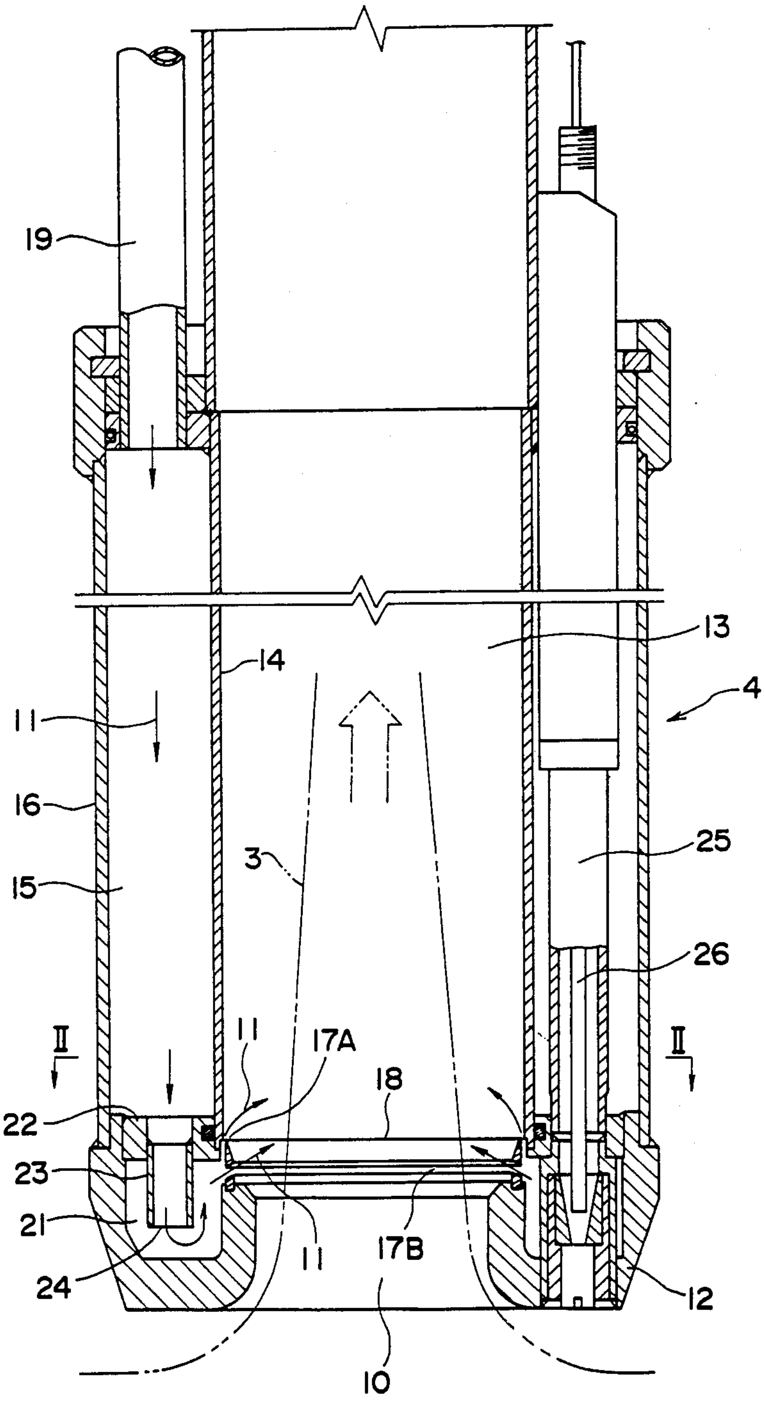
FIG. 1 is a longitudinal section showing a suction head for removal of slag from molten metal in accordance with the invention.
Figure 2:
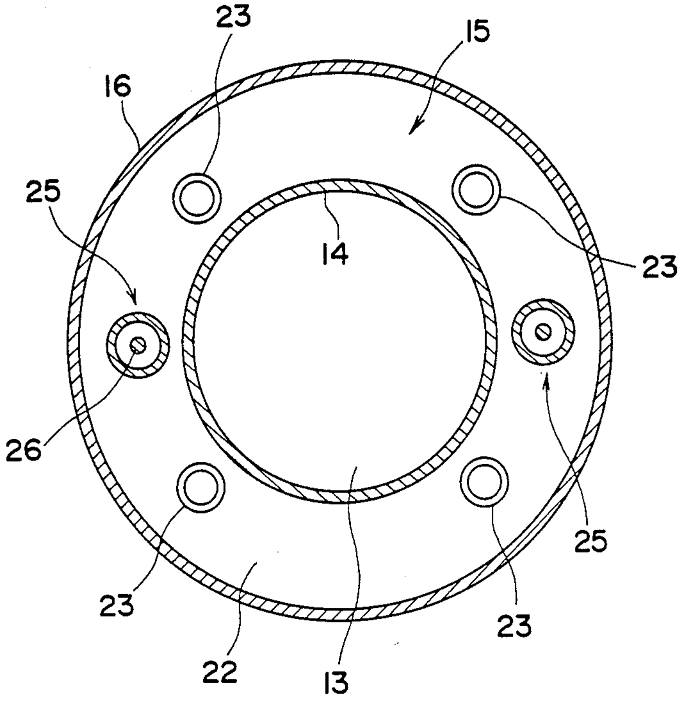
FIG. 2 is a section taken along the line II—II in FIG. 1.
Figure 3:
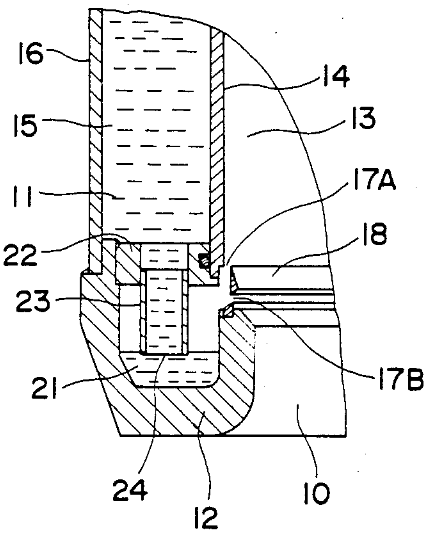
FIG. 3 is a fragmentary view in section illustrating the suction head in FIG. 1 as it appears when in operation.
Figure 4:
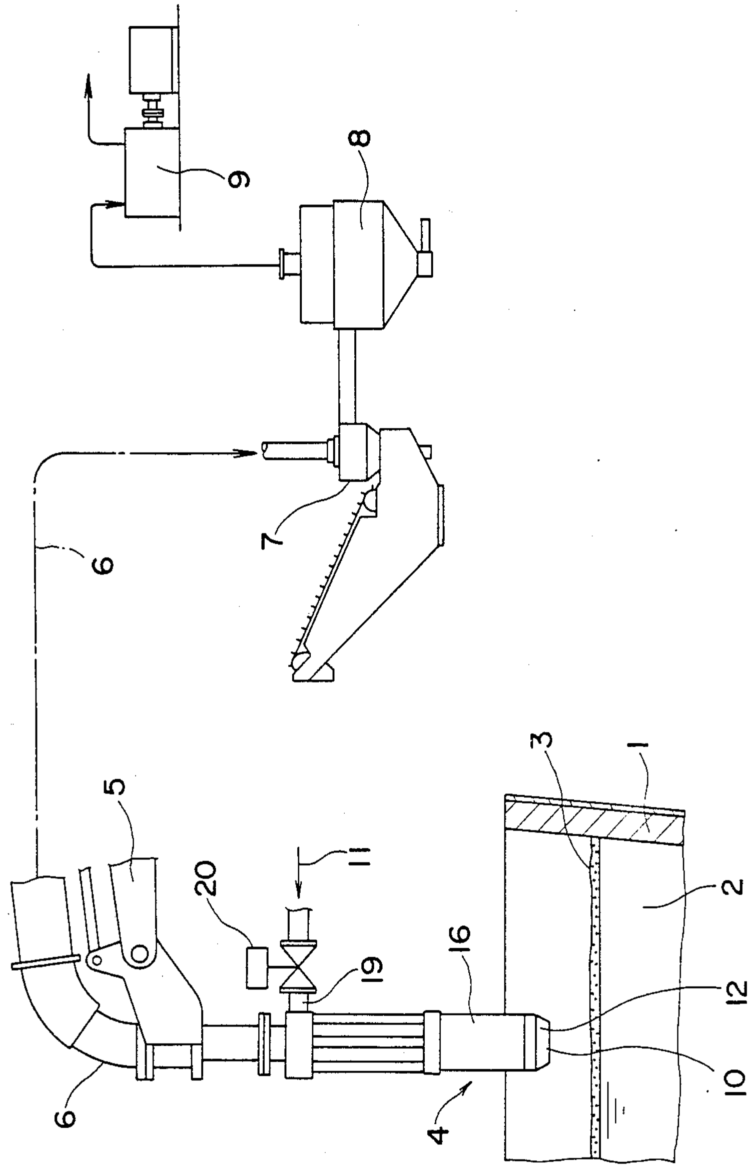
FIG. 4 is a general schematic flow diagram showing an apparatus for removal of slag from molten metal.

In FIG. 4, numeral 1 designates a ladle filled with molten metal 2, on the surface of which slag 3 floats. A suction head 4 is moved by a drive mechanism 5 horizontally along the surface of the molten metal 2 and is also moved up and down depending upon the level of the molten metal 2.

A suction pipe 6 is connected to the suction head 4 and is also connected to a separator 7, which is connected to a vacuum suction device 9 through a condenser 8. When the vacuum suction device 9 is actuated, the slag 3 floating on the surface of the molten metal 2 is sucked through a lower suction port 10 of the suction head 4 and is then solidified into particle form. The solidified slag, the excess cooling water, and the air sucked in with the slag through the suction port 10 are delivered in a ternary phase condition to the separator 7 through the suction pipe 6. In the separator 7, the solidified slag and the excess cooling water are separated from the gas and then collected. The gas, after removal of water vapor therefrom through condensation by the condenser 8, is released into the atmosphere.

In FIGS. 1 to 4, the suction head 4 includes a mouthpiece 12 defining the suction port 10, and a duplex tube having an inner tube 14 defining a suction path 13 and an outer tube 16 which, in conjunction with the inner tube 14, defines a cooling water down-flow passage 15. In the mouthpiece 12 there are provided two-stage annular nozzles 17A, 17B, upper and lower, which are adapted to spray cooling water from the cooling water down-flow passage 15. Numeral 18 designates a ring body which forms the nozzles 17A, 17B and which is disposed between the inner tube 14 and the mouthpiece 12.

A water supply pipe line 19 as shown in FIG. 4 is connected to the upper end of the cooling water down-flow passage 15, there being provided an electromagnetic valve 20 on the pipe line 19. Water supply to the cooling water down-flow passage 15 is effected and stopped through open-close control of the electromagnetic valve 20.

In the interior of the mouthpiece 12 there is formed a water sump 21, which is located below the cooling water down-flow passage 15 and lower than the nozzles 17A, 17B, and which communicates with both the down-flow passage 15 and the nozzles 17A, 17B.

The communication arrangement between the water sump 21 and the cooling water down-flow passage 15 will be explained. The down-flow passage 15 is closed at its lower end with a ring-shaped bottom plate 22, there being communicating tubes 23 fixed to the bottom plate 22 at four locations spaced apart in the circumferential direction thereof. The communicating tubes 23 each has its top end fixed to the bottom plate 22, and its lower end opening 24 is positioned lower than the lower nozzle 17B.

Slag level detector devices 25 are provided in the cooling water down-flow passsage 15 at two locations spaced in the circumferential direction. The detector devices 25 each has a probe 26 which is able to detect the surface level of the slag 3 by contacting the slag 3 as the probe is projected from the lower end of the mouthpiece 12.

The manner of operation of the suction head according to the above described arrangement will now be explained. For sucking operation, the electromagnetic valve 20 shown in FIG. 4 is first opened. Then cooling water 11 from the supply pipeline 19 flows down in the cooling water down-flow passage 15 as the arrows show in FIG. 1, and after passing through the communicating tubes 23 and the water sump 21, the water is sprayed from the nozzles 17A, 17B toward the slag suction path 13. The slag 3 sucked in is solidified in the form of particles by this spraying of cooling water 11.

For stopping the slag sucking operation, the electromagnetic valve 20 is closed to stop water supply to the cooling water down-flow passage 15. Then, the interior of the down-flow passage 15, except the communicating tubes 23, is closed, but the lower end opening 24 of each communicating tube 23 is constantly submerged under the water in the water sump 21 since the opening 24 is positioned lower than the lower-side nozzle 17B. Accordingly, the flow of water in the cooling water down-flow passage 15 is stopped by the atmospheric pressure acting upon the surface of the water in the water sump 21. If the water level in the water sump 21 should become lower than the lower end opening 24 of each communicating tube 23 as a result of vaporization of water in the water sump 21 or otherwise, then water is automatically supplied from the cooling water down-flow passage 15 by the amount corresponding to the decrease so that the water level may be restored to generally the same level as the lower end opening 24 or a slightly higher level.

During a slag sucking operation, negative suction pressure comes up to 100 mmHg. If the electromagnetic valve 20 is closed in stopping the slag sucking operation, water supply to the cooling water down-flow passage 15 is stopped immediately. Howver, suction flow can not stop so quickly because of inertia of the vacuum suction device 9. In such a condition, flow-down of the water is still prevented, since the negative pressure is low as described above.

as an alternative to the electromagnetic valve 20, a stop valve or other type of valve for manual open/close operation may be employed.

Figure 5:
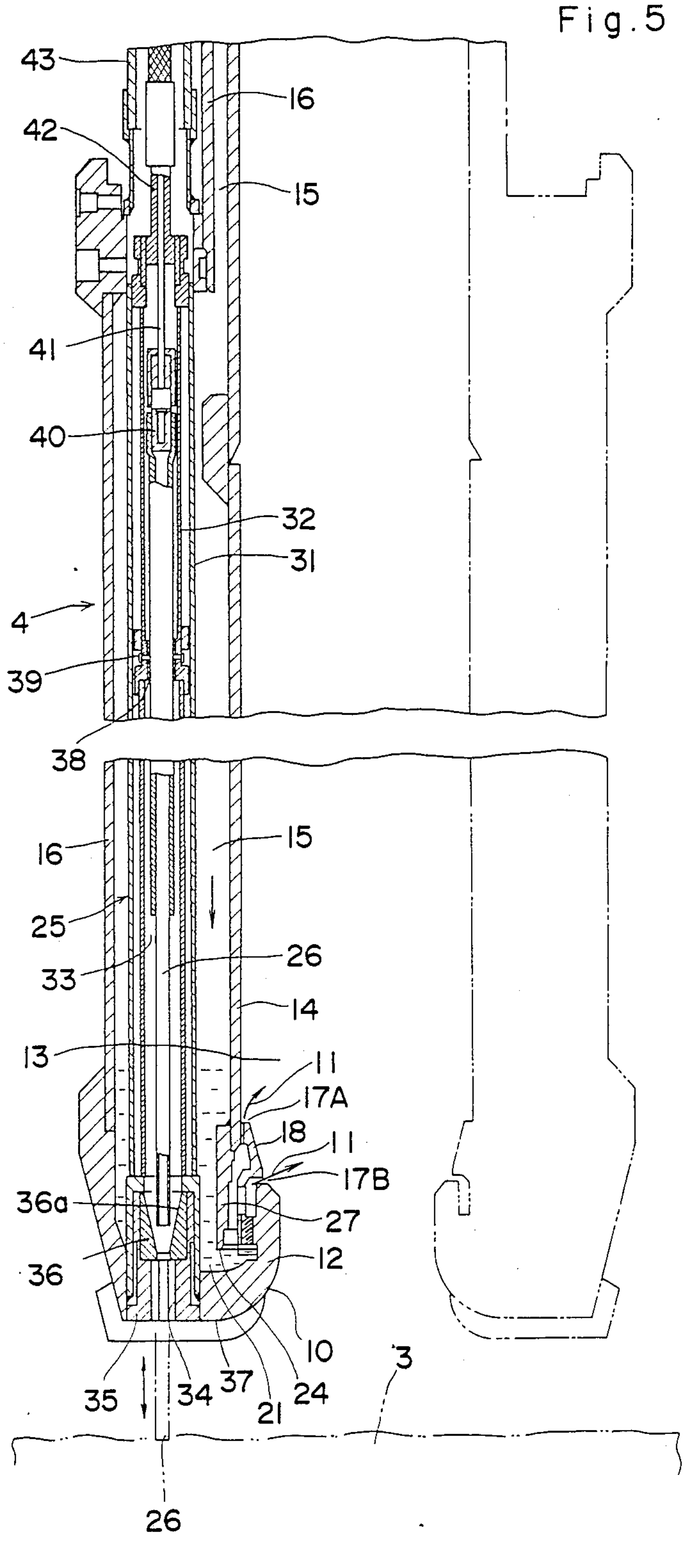
FIG. 5 is a sectional view showing a slag level detector device housed within a cooling water down-flow passage.
Figure 6:
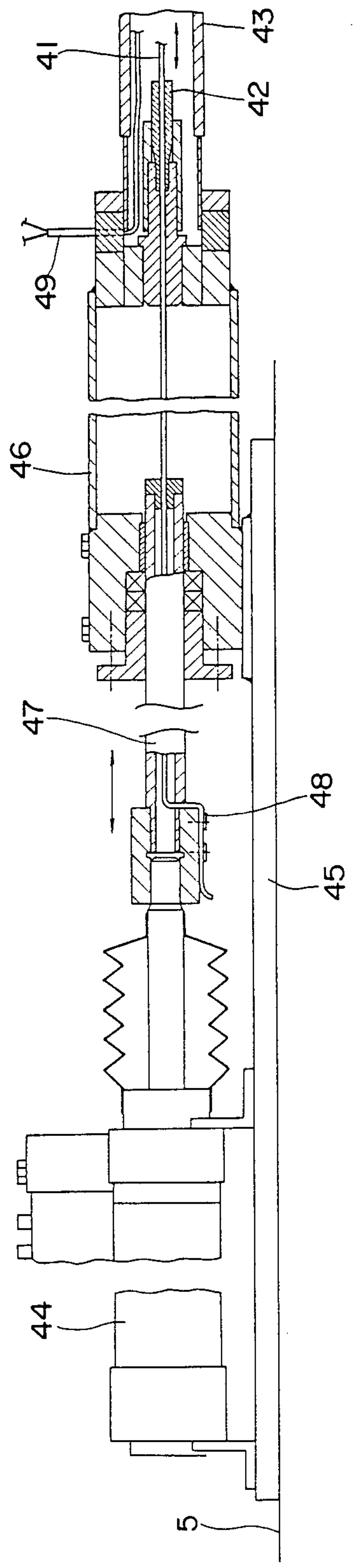
FIG. 6 is a detail view showing a drive mechanism for a probe.
Figure 7:
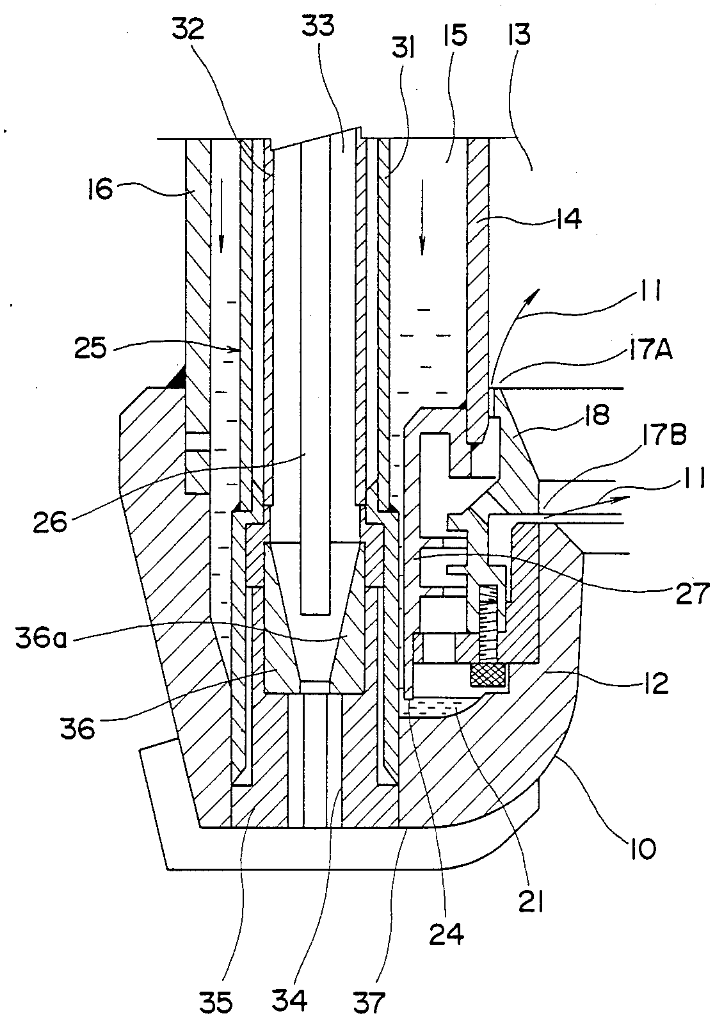
FIG. 7 is a fragmentary detail view showing in FIG. 5.

FIGS. 5 to 7 show another embodiment of the invention.

In this embodiment a cylindrical member 27 is fixed to the outer periphery of the inner tube 14 at the lower end thereof, the lower end of the cylindrical member 27 defining an annular lower end opening 24 continuous along the inner periphery of the down-flow passage 15. The function of such arrangement is same as that of the one shown in FIGS. 1–3, but only the cylindrical member 27 mounted to the lower end of the inner tube 14 is needed to form the lower end opening 24, and such elements as the bottom plate 22 and communicating tubes 23 in the FIGS. 1–3 embodiment can be dispensed with. This means a further simplified construction.

A slag detector device 25 is illustrated in detail in FIGS. 5 and 6. The construction and function of the detector device 25 will now be described. An axially extending tube 31 is housed in the cooling water down-flow passage 15 in such a way that the cooling water is prevented from entry into the tube 31. Within the tube 31 there is inserted an insulation tube 32 having electrical insulation characteristics, in which tube 32 a housing space 33 is defined. An insulator case 35 having a guide hole 34 communicating with the housing space 33 is mounted to the mouthpiece 12. An insulator 36 connected to the insulation tube 32 is held in position in the insulator case 35.

A rod-like probe 26 is housed within the insulation tube 32. The probe 26 comprises a stainless tube which constitutes an electrode, and is axially movable in the insulation tube 32 so that it is projectable from the lower end 37 of the mouthpiece 12 after passing through the insulator 36 and through the insulator case 35. In this conjunction, the inner face 26a of the insulator 36 is tapered so as to guide the front end of the probe 26. A guide ring 38 for slidably supporting the probe 26 is mounted in the insulation tube 32, the guide ring 38 being provided with a current collecting brush 39 which slidably contacts the probe 26.

The upper end of the probe 26 is connected with a wire 41 through an insulation bush 40. The wire 41 projects upwardly from the insulation tube 32, the projecting portion of the wire 41 being positioned along the exterior of the outer tube 16. The wire 41 is covered with an inner flexible tube 42, which is in turn covered with an outer flexible tube 43.

The wire 41 covered with the both flexible tubes 42, 43 extends upwardly beyond the suction head 4, being connected to a cylinder device 44 mounted to a given member of the drive mechanism 5 (FIG. 4).

FIG. 6 illustrates in detail the peripheral arrangement for the cylinder device 44. A base plate 45 is mounted to the aforesaid given member of the drive mechanism 5. The cylinder device 44 and a rod case 46 are mounted on the base plate 45. A front end portion of an actuating rod 47 of the cylinder device 44 is slidably supported by the rod case 46. The flexible tubes 42, 43 are connected to the rod case 46. The wire 41 projects out of the inner flexible tube 42, and after passing through the case 46, is connected to the actuating rod 47 a by means of fastening member 48. A signal cable 49 which is guided to the brush 39 extends through the outer flexible tube 43.

With the above described arrangement, slag level detection is carried out in the following way. When the cylinder device 44 is extended or contracted, the probe 26 is axially moved by the wire 41, being thus caused to project downward or retract, as the case may be; upon it being caused to project, the probe 26 goes into contact with the slag 3 to detect the surface level of the slag 3. A detection signal is transmitted to a control device (not shown) through the signal cable 49. The drive mechanism 5 is actuated by the control device, so that the position of the suction head 4 is set to a level suitable for suction of the slag 3. By repeatedly extending and contracting the cylinder device 44, thereby causing the or each probe 26 to project from the suction head 4 at given intervals, the level of surface of the slag 3 changing from time to time is detected, whereby the suction head 4 may be constantly controlled to a proper position.

What is claimed is:

1. A vertically disposed suction head for removing slag floating on the surface of a molten metal, said suction head having a lower end provided with a suction port adapted to be positioned closely above said slag, slag suction path means extending upwardly through said suction head from said suction port, a cooling water down-flow passage carried by said suction head, and nozzle means for spraying cooling water from said down-flow passage into said suction path means; wherein a water sump is disposed in said suction head below and in communicating relation with said nozzle means, said down-flow passage having a discharge end positioned below said nozzle means and communicating with said water sump, and closing means for closing said down-flow passage at a location upstream from said discharge end.

2. A suction head according to claim 1 wherein said cooling water down-flow passage is an annular passage, a ring-shaped bottom plate closing the lower extremity of said annular passage, and communicating tube means fixed to and extending downwardly from said bottom plate toward said water sump, the lower end of said communicating tube means constituting said discharge end of said cooling water down-flow passage.

3. A suction head according to claim 2 wherein said communicating tube means comprises a plurality of tubes spaced apart in the circumferential direction of said annular passage.

4. A suction head according to claim 1 wherein said cooling water down-flow passage is an annular passage terminating in said discharge end.

5. A suction head according to claim 4 wherein said slag suction path means includes a tube forming the radially inner wall of said annular passage, a cylindrical member fixed to the lower end of said tube, said cylindrical member extending downwardly from said tube into said water sump and having a lower end defining said discharge end of the cooling water down-flow passage.

6. A suction head according to claim 1 wherein a feed water pipeline is connected to said cooling water down-flow passage and said closing means is disposed in said feed water pipeline.

7. A suction head according to claim 6 wherein the closing means is in the form of a valve.

8. A suction head according to claim 13 wherein slag level detector means are provided in the cooling water down flow passage.

9. A suction head according to claim 8 wherein the slag level detector means has a retractable probe adapted for contact with the slag.

10. A suction head according to claim 9 wherein the probe is connected to cylinder means for actuating the probe to project and retract, said cylinder means being disposed away from the suction head.

11. A suction head according to claim 9 wherein the probe is housed within an electrical insulation tube.

12. A suction head according to claim 11 wherein a current collector brush is in slidable contact with the probe.

* * * * *

UNITED STATES PATENT AND TRADEMARK OFFICE
CERTIFICATE OF CORRECTION

PATENT NO. : 4,752,315

DATED : June 21, 1988

INVENTOR(S) : Katsumi Nagasaki et al

It is certified that error appears in the above—identified patent and that said Letters Patent is hereby corrected as shown below:

Column 5, line 7, "26a" should read --36a--

Column 5, line 33, "a by means of" should read --by means of a--

Column 6, line 43, "claim 13" should read --claim 1--

Signed and Sealed this

First Day of November, 1988

*Attest:*

DONALD J. QUIGG

*Attesting Officer*

*Commissioner of Patents and Trademarks*